United States Patent Office 3,154,612
Patented Oct. 27, 1964

3,154,612
PROCESS OF WET SPINNING TEREPHTHAL-
AMIDE POLYMERS FROM CONCENTRATED
PHOSPHORIC ACID SOLUTION AND COM-
POSITION THEREOF
Krzysztof I. Parczewski, Summit, N.J., assignor to Cela-
nese Corporation of America, New York, N.Y., a cor-
poration of Delaware
No Drawing. Filed July 22, 1960, Ser. No. 44,545
12 Claims. (Cl. 264—184)

This invention relates to an improved process for the formation of shaped articles such as filaments of condensation polymers.

There exists a wide variety of synthetic condensation polymers which are suitable for the manufacture of shaped articles, e.g. filaments and fibers for the manufacture of textiles, and films. Many of these polymers have nitrogen, as an integral part of the polymer chain, including the polyamides proper, e.g., the nylons wherein repeating —NRCO-groups are attached to carbons on either side, the polyurethanes which contain repeating —NRCOO-groups, and the polyureas which contain repeating —NRCONR-groups, where R is hydrogen or a monovalent organic radical, e.g., lower alkyl. The usual method of forming these polymers into shaped articles such as filaments and films is to extrude the melted polymer through suitably shaped openings, e.g., the orifices of a spinnerette in the case of the melt spinning of filaments or a slot in the case of film formation.

While melt extrusion techniques are often suitable for many of the aforementioned polymers, there exists polymers within the class set out to which melt extrusion techniques cannot easily be applied. These polymers may be characterized as "difficulty meltable" polymers. For example, in the case of high melting polymers e.g. polyamides melting above 275° C. and polyurethanes and polyureas melting above 179° C., more usually above 210° C. the polymer often begins to degrade seriously at a temperature very close to the melting point and/or the polymer further polymerizes to a useless infusible mass. However, because of the desirable properties of many of these polymers, e.g., a combination of good mechanical properties such as tenacity and elongation, dye receptivity, water insensitivity, and glaze resistance not often found in the more common polymers which can be easily melt spun, any method which can be used to form them into useful shaped articles such as filaments and films is much to be desired.

It is an object of this invention to provide an improved method of forming shaped articles of difficultly meltable condensation polymers containing nitrogen, as an integral part of the polymer chain. It is a further object of this invention to provide a method of forming shaped articles, e.g. filaments, from the aforementioned difficultly meltable polymers which avoids the difficulties of melt spinning set out above. Other objects will be apparent from the following detailed description and claims.

In accordance with one aspect of the invention, a difficultly meltable condensation polymer containing nitrogen in the polymer chain is dissolved in a solvent containing more than 85%, e.g., at least 90% by weight of phosphoric acid, $H_3PO_4$. It has been found that suitable polymer shaping (spinning) solutions may be formed from the resulting solutions despite the fact that the polymer is insoluble in commercial concentrated phosphoric acid containing about 85% by weight of phosphoric acid and the remainder water, or the polymer has such a limited solubility in the commercial acid that the resulting solution cannot easily be used for the formation of shaped articles such as filaments.

Phosphoric acid of greater than 85% by weight concentration may be made, for example, by adding phosphorous pentoxide to commercial phosphoric acid of 85% by weight concentration in an amount sufficient to bring the concentration up to the desired level.

The process of this invention may be applied, for example, to fiber and film forming linear polyamides having repeating structural units of the formula

—NR—Y—NR'—CO—Y'—CO— obtained, for example, from the condensation of a dicarboxylic acid or a derivative, e.g. a salt, acyl halide or ester of such an acid with a diamine, polyamides having repeating structural units of the formula

—NR—Y—CO— obtained, for example, from the autocondensation of aminocarboxylic acids, or lactams of such acids, fiber and film-forming polyurethanes having repeating structural units of the formula

—NR—Y—NR—CO—O—Y'—CO—O— obtained, for example from the condensation of a diisocyanate with a dihydric alcohol or of a diamine with a bis(chloroformate) of a dihydric alcohol, and fiber- and film-forming polyureas having repeating structural units of the formula

—CO—NR—Y—NR—CO—NR'—Y'—NR'— obtained, for example, from the condensation of a diisocyanate with a diamine, a diamine with a diurethane, or a diamine with phosgene, wherein the R's are hydrogen or monovalent organic radicals, e.g. lower alkyl such as methyl or ethyl, and the Y's are divalent organic radicals such as alkylene containing 1 to 10 carbon atoms e.g., ethylene, tetramethylene or hexamethylene, arylene such as para- or meta- phenylene, para xylylene or para-diethylene benzene, cyclohexylene, or divalent heterocyclic radicals such as those derived from piperazine and alkyl substituted piperazines wherein the open bonds are attached to nitrogen atoms, and wherein the monomers are such that and/or the polymerization technique used is such that a polyamide melting above 275° C. or a polyurethane or polyurea melting above 179° C. preferably above 210° C. is obtained. These include, for example, many polymers having repeating structural units of the above formulas, in which at least one repeating group is or contains a para- or meta- phenylene or 1,4-cyclohexylene radical. It has been found that whereas these relatively high melting polymers cannot easily be shaped using melt extrusion techniques because of their tendency when heated to degrade or decompose or to further polymerize to a useless, infusible mass, and are generally insoluble in commercial phosphoric acid of 85% by weight concentration, they can be shaped by dissolving them in a solvent containing more than 85%, e.g., at least 90% by weight of phosphoric acid and extruding into a coagulating liquid by means of wet spinning techniques.

An important group of polyamides are condensation products of a diamine and terephthalic acid or a derivative of terephthalic acid, e.g., terephthaloyl chloride or dialkyl terephthalate. Some specific polymers within this latter group are poly (polymethylene) terephthalamides wherein the polymethylene groups contain 1 to 10 carbon atoms, e.g. polyhexamethylene terephthalamide, polytetramethylene terephthalamide, polyethylene terephthalamide and polypiperazylene terephthalamide, e.g., prepared by condensing piperazine with terephthaloyl chloride.

Some specific high melting autocondensation products of an aminocarboxylic acid or a lactam or other derivative of such an acid are polymers of para-aminobenzoic acid or its lactam, polymers of 1-carboxymethyl-4-aminocyclohexane or its lactam, polymers of 1-carboxy-4-aminocyclohexane or its lactam, and polymers of 1-carboxy-3-aminocyclopentane or its lactam.

Some specific polyurethanes are for example, the condensation product of tetramethylene diamine with bis(chloroformate) of butanediol-1,4, which has a melting point of 220° C., the condensation product of piperazine with the bis(chloroformate) of bis(p-hydroxyphenyl) propane-2,2 having a melting point of 230–245° C., the condensation product of piperazine with the bis(chloroformate) of cis-1,4-cyclohexylene glycol having a melting point of 275 C. and the condensation product of piperazine with the bis(chloroformate) of trans-1,4-cyclohexylene glycol having a melting point of above 390° C.

Specific polyureas are for example, the condensation product of hexamethylene diisocyanate with hexamethylene diamine which has a melting point above 300° C. and the condensation product of m-phenylene diisocyanate with m-phenylene diamine.

The solutions formed in accordance with this invention may contain, for example, 5 to 30, preferably 10 to 20% by weight of polymer based on the weight of the solution. While it is convenient in many cases to prepare the solution at room temperature, the solutions may be prepared within a wide temperature range, e.g. 20° C. to 150° C. and may be extruded to form shaped articles at a temperature in the range of 20° C. to 150° C. Among other advantages, it has been found that little or no degradation of the polymer occurs when it is dissolved to form the solutions of this invention. This is true even when the solution is stored at room temperature for a considerable period.

In accordance with another aspect of the invention, shaped articles such as filaments and films of the foregoing polymers are formed by extruding the phosphoric acid solution of the polymer through an enclosed space of predetermined cross-section into an aqueous solution of phosphoric acid, $H_3PO_4$, having a concentration considerably lower than that of the acid in which the polymer is dissolved and low enough so that the polymer is coagulated into a shaped article. In general, particularly desirable shaped articles of polymers such as high molecular weight polyterephthalamides may be obtained if the phosphoric acid concentration of the coagulating bath is up to 60% by weight.

The following examples further illustrate the invention.

*Example I*

Polyhexamethylene terephthalamide having an inherent viscosity of 1.24 and prepared from hexamethylene diamine and terephthaloyl chloride by the interfacial technique using magnesium oxide as an acid-binder as described in application Serial No. 6,885 filed February 5, 1960, by Jamison, was dissolved at 50° C. in 100% phosphoric acid to yield a solution containing 7.5% by weight of polymer and having a viscosity of 816 poises at 25° C. The solution was extruded through a 0.200 mm. jet into aqueous phosphoric acid containing 5% by weight of $H_3PO_4$ at room temperature to form a useful filament of 100 denier, 0.45 g./d. tenacity and 90% elongation.

The spinning solution of this example could also be extruded into aqueous phosphoric acid of different acid concentration, e.g., up to 60% by weight, to yield useful filaments.

*Examples II to IV*

Polyhexamethylene terephthalamide having an inherent viscosity of 1.02 measured in sulfuric acid was dissolved in aqueous phosphoric acid of 90%, 95% and 100% by weight to yield 10% by weight polymer solutions having viscosities at 25% C. of 400, 864 and 2336 poises respectively. These solutions could be formed into useful shaped articles by extruding into aqueous phosphoric acid of up to 60% by weight $H_3PO_4$ concentration.

*Examples V and VI*

Polyethylene terephthalamide was dissolved in aqueous phosphoric acid of 95% and 100% by weight of phosphoric acid to yield solutions of 10% by weight polymer concentration which could be formed into useful shaped articles by extrusion into aqueous phosphoric acid of up to 60% by weight $H_3PO_4$ concentration.

*Examples VII to IX*

Polytetramethylene terephthalamide was dissolved in aqueous phosphoric acid of 90%, 95% and 100% by weight concentration to yield solutions containing 10% by weight of polymer which could be formed into shaped articles by extrusion into aqueous phosphoric acid of up to 60% by weight $H_3PO_4$ concentration.

*Example X*

Polyphenylene-p-diethylene terephthalamide made by condensing bis-p-(beta-aminoethyl)benzene with terephthaloyl chloride was dissolved in 100% phosphoric acid to yield a solution containing 10% by weight of polymer which could be formed into shaped articles by extrusion into aqueous phosphoric acid of up to 60% by weight $H_3PO_4$ concentration.

The inherent viscosities referred to above represent the function $$\frac{\ln \eta r}{C}$$

at 25 C. and 0.1% polymer concentration of a solution of the polymer in concentrated sulfuric acid, where $\eta r$ is the relative viscosity of the solution at 25 C. i.e. the ratio of the viscosity of the polymer solution to the viscosity of the solvent acid, and C is the polymer concentration expressed as percentage ratio of polymer weight in grams to acid volume in cubic centimeters. The inherent viscosity is thus expressed in units of deciliters per gram.

It is to be understood that the foregoing detailed description is given merely by way of illustration and that many variations may be made therein without departing from the spirit of my invention.

Having described my invention what I desire to secure by Letters Patent is:

1. The process of spinning a terephthalamide polymer which comprises dissolving said polymer in a solvent containing over 85% by weight phosphoric acid; extruding the resulting solution through a spinnerette; coagulating said extruded solution into fibers in a phosphoric acid bath consisting of less phosphoric acid than did said solution; and taking up the thus formed fibers from said coagulating bath.

2. The process claimed in claim 1 wherein said polymer is a poly (polymethylene) terephthalamide having a melting point of at least 275° C.

3. The process claimed in claim 1 wherein said polymer is polyhexamethylene terephthalamide.

4. The process claimed in claim 1 wherein said solvent and said coagulating solution are both aqueous.

5. The process claimed in claim 4 wherein said solvent consists of at least 90% by weight phosphoric acid and said coagulating solution consists of up to about 60% by weight phosphoric acid.

6. The process claimed in claim 4 wherein said polymer is dissolved in said solvent in an amount of 5 to 30% by weight.

7. A solution from which a fiber can be spun consisting essentially of a polyterephthalamide having a melting point of at least 275° C. dissolved in a solvent containing at least 85% by weight phosphoric acid.

8. A solution as claimed in claim 7 wherein said solvent is aqueous.

9. A solution as claimed in claim 7 wherein said polyterephthalamide is a poly (polymethylene) terephthalamide.

10. A solution as claimed in claim 7 wherein said polyterephthalamide is polyhexamethylene terephthalamide.

11. A solution as claimed in claim 8 wherein said solvent consists essentially of at least 90% by weight phosphoric acid.

12. A solution as claimed in claim 7 containing 5 to 30% by weight polyterephthalamide.

References Cited in the file of this patent

UNITED STATES PATENTS

| | | |
|---|---|---|
| 2,489,569 | Foulds et al. | Nov. 29, 1949 |
| 2,790,700 | Stanton et al. | Apr. 30, 1957 |